UNITED STATES PATENT OFFICE.

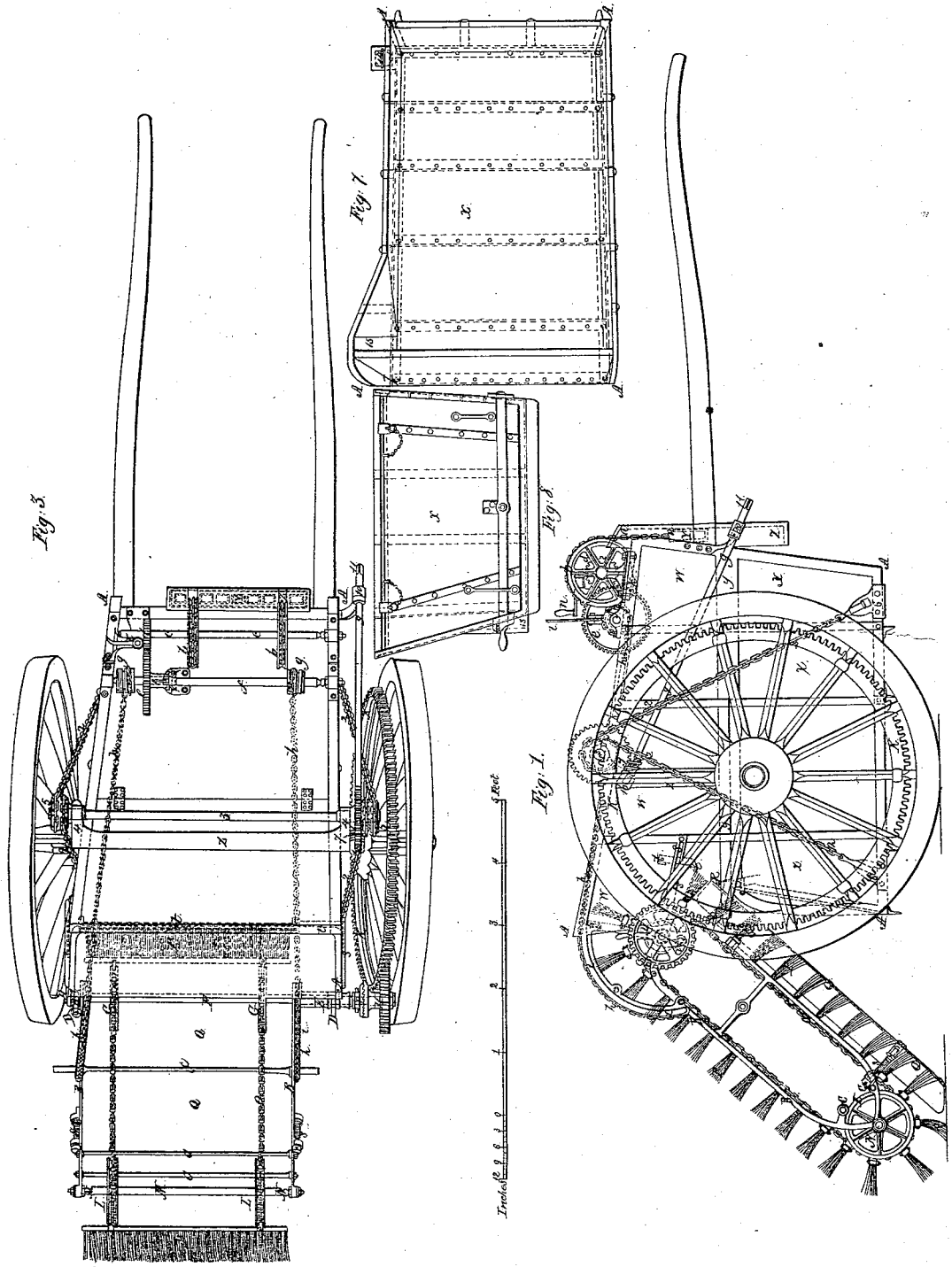

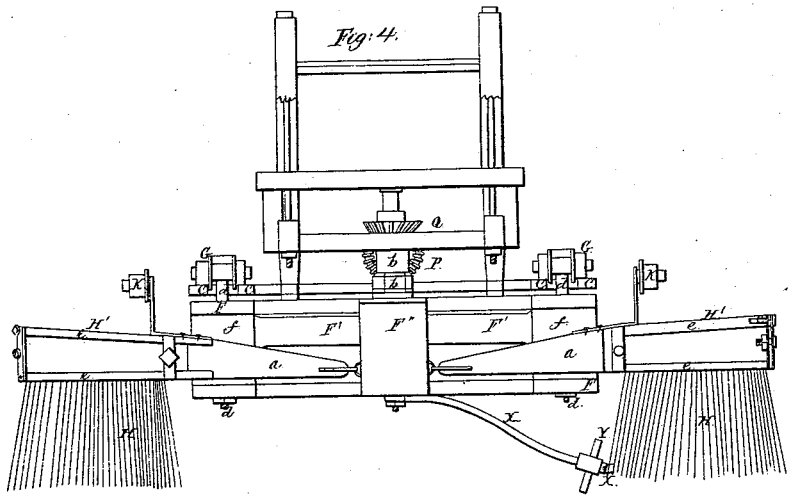
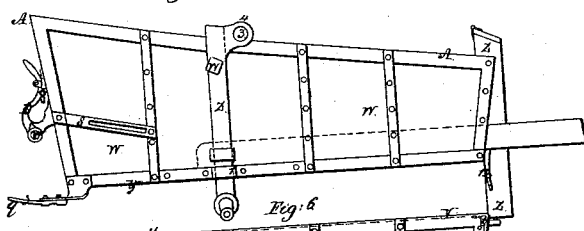
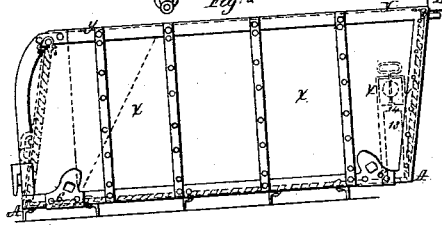

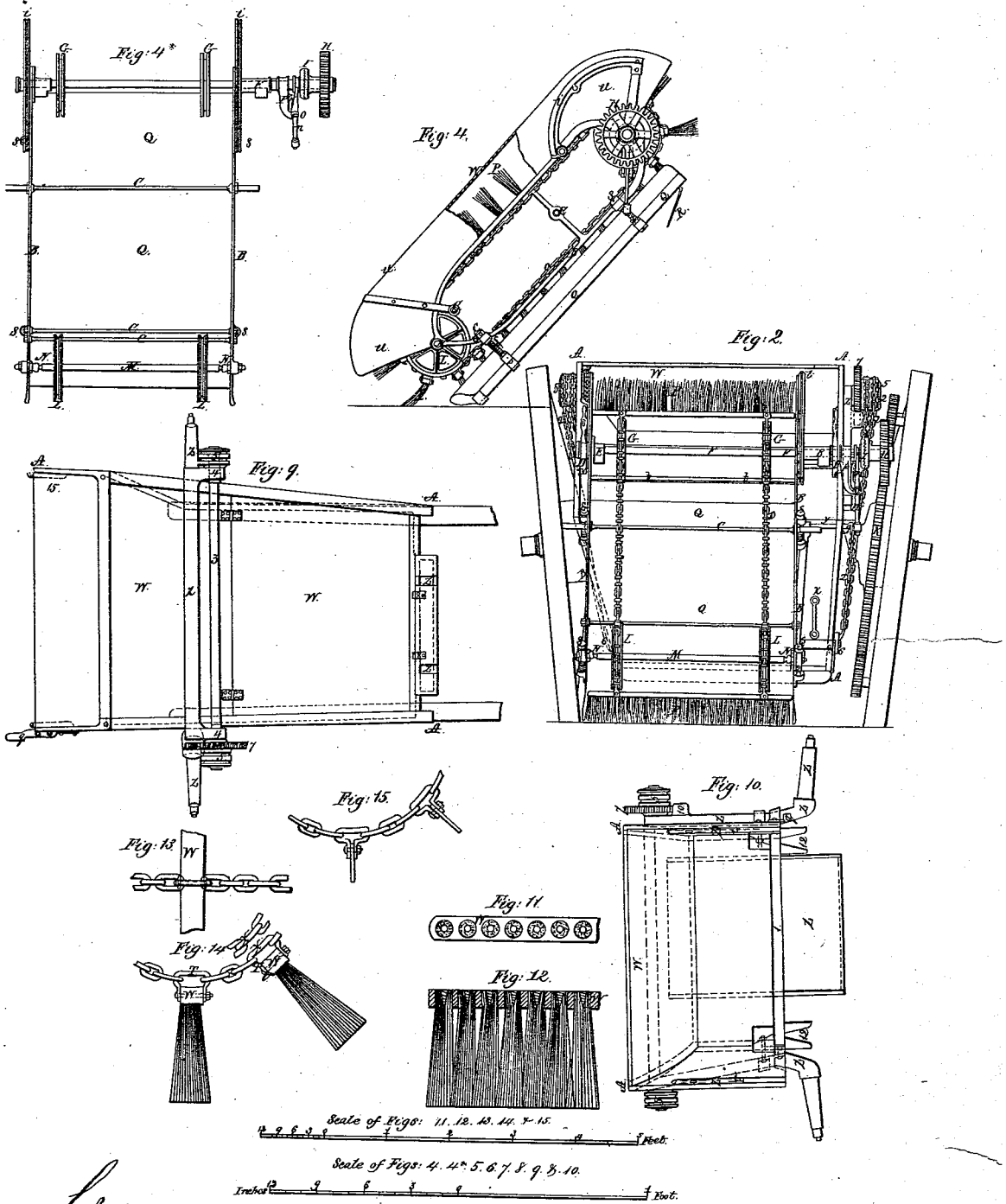

JOSEPH WHITWORTH, OF MANCHESTER, ENGLAND.

IMPROVEMENT IN MACHINES FOR SWEEPING AND CLEANING STREETS.

Specification forming part of Letters Patent No. 3,124, dated June 1, 1843.

*To all whom it may concern:*

Be it known that I, JOSEPH WHITWORTH, engineer, of Manchester, in the county of Lancaster and Kingdom of England, have invented or discovered a new and useful invention of certain Improvements in Machinery or Apparatus for Cleaning Roads, and which machinery is also applicable to other similar purposes; and I do hereby declare that the following is a full and exact description thereof—that is to say, my improvements in machinery or apparatus for cleaning roads, which machinery is also applicable to other similar purposes, are shown in detail in the drawings accompanying this specification. They represent a machine whereby the several processes of sweeping, loading, and carrying are combined in one operation. The machine consists of a low-bodied cart, moved by horse or other power, having an apparatus attached whereby, as the cart proceeds forward, the loose soil, &c., is taken from the surface of the ground and deposited in the interior.

Figure 1 is a side elevation, Fig. 2 an end elevation, and Fig. 3 a horizontal view, of the machine.

The following figures represent detached portions of the same.

Corresponding parts are severally marked with the same letters or numbers in all the figures.

A is the outline of the cart.

B are the side frames of the cleaning apparatus, formed of wrought-iron and connected together by cross-stays C.

The apparatus is attached to the cart by brackets D, carrying the hollow bosses E, screwed to the side frames B. The bosses E form bearings for the axis F, carrying the chain pulleys G and wheel H. This wheel is loose in the axis F, to which it is connected by the sliding clutch I. It gears with the cog-wheel K, attached by staples to the off-side wheel of the cart. When the sliding clutch I is in gear, the rotary motion of the running wheel as the cart goes forward is communicated by the wheels K H and axis F to the pulleys G. A second pair of chain pulleys L is fixed on the axis M, carried by the adjustable steel centers N in the side frames B. The chains O, with the brooms P attached, are stretched over the corresponding pulleys and move round with them as the cart proceeds forward. Each broom is successively brought into contact with the ground, and the loose soil on the surface is swept up the carrier-plate Q, at the top of which it is thrown forward into the cart.

R is a flap or apron connected by a hinge to the top of the plate to prevent any portion of the soil, &c., from falling between the plate and the back of the cart.

The carrier-plate Q is suspended from the side frames B by screws S, and has no direct communication with the cart. It may be made of sheet-iron, and should have on the lower edge a strip of steel to defend it from the effect of occasional friction with the ground. As the brooms wear, the position of the carrier-plate requires adjustment by the screws S, in order to keep it in contact with the shortened brooms as they pass upward.

For the beard of the brooms I find peassava (a product of South America) to be particularly serviceable. It may be directly inserted into the broom-stock, small portions being separately placed in conical holes drilled through the stock at short intervals, and each separate portion being secured by pitch and by a small wedge driven in from the back, as shown, Figs. 11 and 12.

The chains by which the brooms are connected are formed of open and closed links, as shown, Figs. 13 and 14. The open link T has two flat ends U, between which the stock W of the broom is secured by a screwed pin and nut.

To facilitate the management of the chain, one of the open links (out of the entire series of each chain) has a joint X, which, when the nut is removed, allows one of the flat ends to be drawn through the adjoining link, whereby the continuous connection of the endless chain is revolved. The tension of the chain over the pulleys G L is regulated by substituting longer or shorter links at the point X, as occasion may require.

Provision is made for regulating the pressure of the brooms on the ground, according to the state of the surface, in the following manner. The bearings E have rotary play in the brackets D, by which they are attached to the cart, and hence, the entire apparatus swinging in the brackets D, the lower brooms bear on the ground with considerable pressure.

This pressure is relieved by weights which counterbalance a certain portion of the weight of the apparatus. Y is a weight placed in the front of the cart for this purpose. It hangs in the recess Z from the chains $a$, wound on the pulleys $b$. The axis $c$ of the pulleys has its bearings in steel centers fixed in standards on the cart and carries the pinion $d$, taking into the wheel $e$ on the axis $f$. This axis is parallel with the former and is similarly supported. It carries the grooved pulleys $g$ for the chains $h$, the ends of which are fastened in one direction to the pulleys $g$ and in the other to the segments $i$, screwed to the side frames B. The weight Y will thus tend to counterbalance the sweeping apparatus, and thereby relieve the pressure of the brooms on the ground. A series of holes is formed in the weight Y for loose weights, whereby the pressure may be regulated to any nicety. Other methods might be adopted for the same purpose, but not so advantageously. One advantage of the weight consists in the equality of its action, whatever may be the position of the apparatus as affected by the inequalities in the surface of the ground.

By the chains $h$ the apparatus may be raised from the surface into a horizontal position. For this purpose the wheel $e$ is made to slide from the pinion $d$ into gear with the worm $k$ by the lever $l$. The driver, by means of the handle $m$, can then raise the apparatus whenever occasion may require, and it will continue suspended by the action of the worm on the wheel. The worm $k$ is placed close to the pinion $d$, that it may receive the teeth of the wheel $e$ partially into gear before they are entirely slided out of gear with those of the pinion, and the state of suspension of the apparatus be thereby maintained. As the apparatus is raised the clutch I is thrown out of gear by the lever $n$, having its fulcrum at $o$ on an arm $p$, fixed on the bearing E. One end of the lever is moved sidewise as the apparatus rises by the inclined piece $q$, fixed on the cart, and the revolution of the brooms ceases. When the apparatus is lowered, the clutch I is carried into gear by a spring $r$, fixed on the arm $p$.

The side pieces $s$ carry the bars $t$ (commonly called "doctors") for cleaning the brooms as they revolve. These pieces are slotted to afford the opportunity of adjusting the position of the doctors to the length of the brooms.

$u$ is a covering of tarpaulin or light boards.

The brackets D, by which the apparatus is attached to the cart, are made with a joint $v$ and secured by a split key. The entire apparatus may thus be detached from the cart, as shown in Fig. 4, which represents a side view of the apparatus, and Fig. 4*, which is an oblique elevation of the same without the brooms.

The cart itself is constructed of two distinct parts, as shown in the drawings, in which the upper part is marked $w$ and the lower $x$, having their junction at the line $y$.

Fig. 5 is a side elevation of the upper portion of the cart. Fig. 6 is the lower portion of the same; Fig. 7, a horizontal view of the lower portion of the cart, and Fig. 8 an elevation of the back of the same. Fig. 9 represents the top of the upper portion of the cart shown in horizontal view, and Fig. 10 is an elevation of the back of the same.

Both parts of the cart have a strong framing of angle-iron with cross-ribs, to which are fastened boards of timber or plates of sheet-iron. The cart-axle $z$ passes round the upper part. It is forged of great strength and supported by the cross-stay 1. The lower part $x$ of the cart, which contains the load of soil, &c., is suspended from the axle $z$ by the chains 2. The weight of the loaded part $x$ is thus confined to the axle and has no tendency to derange the action of the apparatus. The opportunity is also afforded of conveniently attaching and detaching the part $x$. For this purpose the shaft 3, bearing in projections 4 on the axle $z$, carries the grooved pulleys 5 for the chains 2, the ends of which are fastened in one direction by hooks to the eye-pieces 6 on the part $x$ and in the other to the pulleys 5. The wheel 7 on the axis 3 gears with the worm 8 on the shaft 9, which has its bearings at 10 and is worked by a handle at 11. The part $x$ may thus be lowered to the ground and the chains unhooked, when the sweeping apparatus (raised into the horizontal position, as before described) may be drawn with the part $w$ over the part $x$, the latter being thus completely disengaged. If loaded at the time, it may be emptied at leisure or hoisted and made to discharge its contents instantaneously, provided suitable apparatus be at hand. To reattach the part $x$, the part $w$ should be moved backward over it and the chains applied. As it is drawn up by the handle at 11, the pieces 12, fixed to the part $w$, guide it into the proper position.

In working the carts it will be found convenient and economical to provide an extra number of the lower parts to afford opportunity for substitution as occasion may require.

It will be observed that the cart is not symmetrical, the near side being made to expand outward as much as the running wheel will allow, as shown at 15, Figs. 7, 8, and 9. This form is given to enable the brooms to act near the curbstone along the side of streets or roads.

The apparatus I have now described might be modified by substituting for the brooms scrapers formed of hoop-iron or strips of wood and attached to the endless chains in precisely the same manner as the brooms. (See Fig. 15.) After scraping the surface of the ground they would move up the carrier-plate, carrying the soil, &c., with them. This change may be found advantageous in certain states of the ground-surface, when there is a large quantity of snow or other soft substance to be removed. It would involve no other alteration on the apparatus except that the doctors would then be dismissed. The scrapers or brooms move with sufficient velocity to throw the soil, &c., from the top of the carrier-plate with considerable force into the cart; but in dry weather the soil, &c., accumulates rather more at the hinder part, and it is necessary, in order completely to fill the cart, that the driver should distribute the load. This he can easily do by entering the cart through an opening provided in the top.

13 is a pipe for drawing off from the interior of the cart the water which in wet weather is swept into it from the surface of the street. The pipe has its orifice about fourteen inches from the bottom of the cart, and is fitted with a plug 14. The cart being drawn to the side of the street and the plug withdrawn, the water above the orifice of the pipe will be discharged into the gutter.

*Note.*—The series of brooms or scrapers could be so arranged as to compose an endless broom or scraper of a circular form, the carrier-plate being also curved to correspond.

The improved machinery which I have described may be used in cleaning the surface of ground not being part of roads, and is therefore applicable to other similar purposes.

Having now described my said improvements, I would have it understood that I limit my claim to the following particulars:

1. The manner of counterbalancing any desired portion of the weight on the carrier-plate, the endless chain of brooms, and their appendages, by means of the weight or weights Y, through the intermedium of the chains, pulleys, and segments arranged and operating, substantially as set forth, so as to relieve and regulate the pressure of the brooms, &c., on the ground or to raise them up entirely when desired.

2. The manner of widening out the cart at its rear end on the near side, as shown at No. 15, Figs. 7, 8, and 9, so as to allow the brooms, &c., to operate near the curbstone at that part.

3. The manner of forming the cart in two parts $w$ and $x$ and of attaching and suspending the lower part by means of the chains 2 2 and the grooved pulleys 5 5, attached to the axle $z$ and otherwise connected and arranged, as set forth.

4. The manner of forming the brooms or scrapers into endless chains by means of open and closed links, as described.

5. The so combining rotating brooms with an incline or carrier-plate that the incline or carrier-plate and the framing which carries the brooms may be adjusted as the brooms wear away, the same being effected by an arrangement of parts the same with that described.

JOS. WHITWORTH.

Witnesses:
 SAM. PEARCE,
 H. WILDING.